W. A. LENTS.
SPRING HUB.
APPLICATION FILED NOV. 11, 1915.
1,192,079.
Patented July 25, 1916.
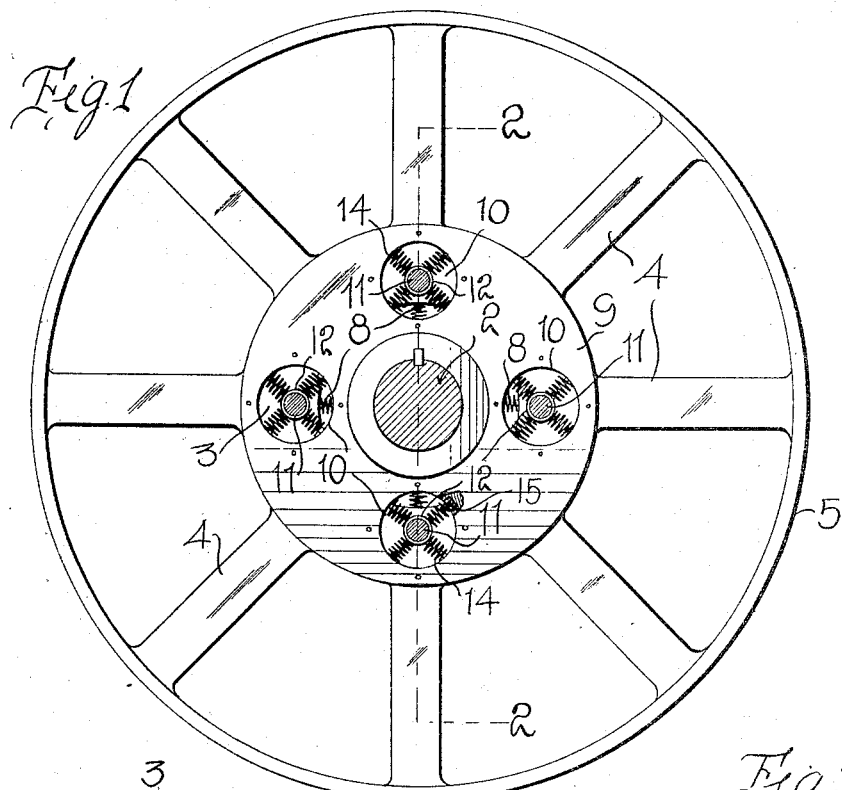
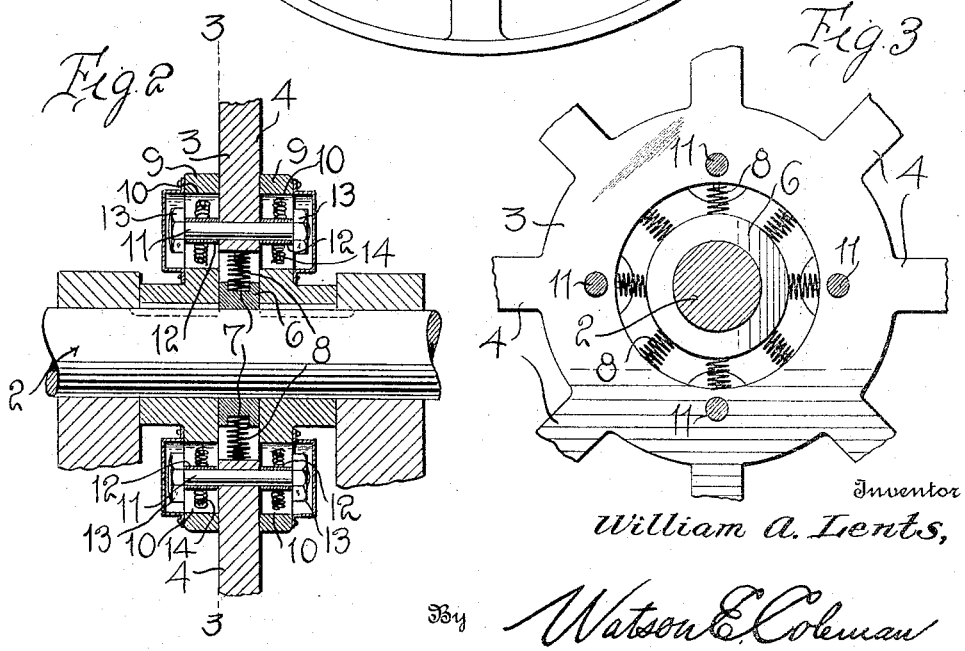
Inventor
William A. Lents,
By Watson E. Coleman
Attorney

UNITED STATES PATENT OFFICE.

WILLIAM A. LENTS, OF HARDIN, KENTUCKY.

SPRING-HUB.

1,192,079.  Specification of Letters Patent.  Patented July 25, 1916.

Application filed November 11, 1915. Serial No. 60,931.

*To all whom it may concern:*

Be it known that I, WILLIAM A. LENTS, a citizen of the United States, residing at Hardin, in the county of Marshall and State of Kentucky, have invented certain new and useful Improvements in Spring-Hubs, of which the following is a specification, reference being had to the accompanying drawings.

My invention relates to spring hubs, and the general object of my invention is to provide a hub so constructed that it will cushion shocks on the wheel mounted upon the hub.

Another object of my invention is to so construct the hub that it will resiliently cushion shocks, acting either radially of the wheel or circumferentially thereof.

A further object of the invention is to provide a spring hub which may be used in all classes of machinery for the purpose of relieving sudden strain upon the shafts, wheels and like parts.

Other objects will appear in the course of the following description.

My invention is illustrated in the accompanying drawings, wherein:

Figure 1 is a side elevation of a hub constructed in accordance with my invention, partly in section, with the partitions removed. Fig. 2 is a transverse section on the line 2—2 of Fig. 1; and Fig. 3 is a side elevation of the spoke ring, the axle being in section.

In the drawings, 2 designates a shaft or axle which may be supported in any suitable manner and may be considered to be the axle of an automobile or the shaft upon which a driving pulley is mounted. Rotatably mounted upon this shaft is a spoke ring 3 illustrated in Fig. 3 which is considerably greater in diameter than the shaft and carries the outwardly radiating spokes 4 upon which the rim 5 is mounted. Loosely surrounding the shaft or axle 2 is an annulus 6 which forms a bearing ring for the spoke ring, this annulus 6 being formed upon its periphery with a plurality of seats 7 having a plurality of radially arranged coiled springs 8, the outer ends of these coiled springs bearing against and being operatively connected to the inner surface of the hub ring 3. There may be as many of these springs as desired. It will thus be seen that the hub ring is resiliently supported upon the shaft or axle and that the springs will yield under shock, thus cushioning the wheel or hub.

Disposed on each side of the spoke ring 3 and keyed to the shaft 2 are the disk-like members 9. Each of these members 9 at a plurality of points is cut away to provide an opening 10. Four of these openings are shown but more or less of these openings may be used, as desired. These openings 10 are shown as circular in form, but they might be of any other desired shape. Passing through the spoke ring 3 are the transversely extending pins 11, one for each of the openings 10. These pins project into and through the openings 10 and each end of the pin carries a sleeve 12. Nuts or heads 13 are disposed at the ends of the pins which hold the sleeves in position. Bearing against each sleeve is a plurality of radially disposed coiled springs 14, illustrated as four in number, the outer ends of the springs being disposed in seats 15, these seats being formed with inwardly projecting pins around which the outer end of the spring is coiled.

With the construction above described it is obvious that a rotation of the wheel 5 will carry the several pins 11 in a circumferential direction with relation to the disks 9 and that this circumferential movement of these pins will be resisted by the tension of the springs 14. It will further be evident that a radial movement of the spoke ring relative to the hub will also be resisted not only by the springs 8 but by the springs 14. It will also be evident that four of these springs 14 will always be in action to resist any radial movement and that all of the springs will resist any rotative movement of the wheel relative to the hub and that further any radial movement of the wheel relative to the hub will be resisted by the springs 8.

While I have illustrated in Fig. 2 two disks 9 disposed one on each side of the spoke ring, yet I do not wish to be limited to this as one of the disks 9 may be left off, the pins 11 in this case projecting laterally from the spoke ring. It will be obvious that my invention may be applied not only to the wheels of automobiles and other vehicles, but to the connections between pulleys and shafting or between any shaft and a power receiving or delivering wheel mounted thereon.

Having described my invention, what I claim is:

1. A cushion hub comprising a centrally disposed ring adapted to snugly embrace a shaft, or axle, a spoke ring concentric to the shaft ring, radially disposed springs supporting the spoke ring on the shaft ring, a laterally disposed disk having a plurality of openings, pins on the spoke ring extending into the openings, and a plurality of springs disposed between each pin and the wall of the opening.

2. A cushion hub comprising a centrally disposed ring adapted to embrace a shaft or axle, a spoke ring concentric to the shaft ring, radially disposed springs located between the shaft ring and the spoke ring, disks disposed one on each side of the spoke ring and shaft ring and adapted to be rotatably engaged with the shaft to bear thereon, said disks having alining openings, pins passing through the spoke ring and into said openings, and a plurality of springs in each opening engaging the corresponding pin and the wall of the opening.

3. The combination with a shaft, of an annulus surrounding the shaft and rotatable with relation thereto, a spoke ring surrounding the annulus and spaced therefrom, radially disposed coil springs between the annulus and the spoke ring, oppositely disposed disks disposed on each side of the annulus and the spoke ring and operatively engaged for rotation with the shaft, pins carried by the spoke ring and projecting laterally therefrom, the disks being formed with alining openings into which the pins pass, the openings being considerably larger than the pins, sleeves mounted upon the projecting ends of the pins, and a plurality of coiled springs disposed in each opening of each disk, bearing at their outer ends against the wall of the opening and at their inner ends against the corresponding sleeve.

WILLIAM A. LENTS.

Witnesses:
L. L. BEALE,
T. P. TATUM.

Copies of this patent may be obtained for five cents each, by addressing the "Commissioner of Patents, Washington, D. C."